United States Patent [19]
Chung et al.

[11] Patent Number: 6,012,090
[45] Date of Patent: *Jan. 4, 2000

[54] CLIENT-SIDE PARALLEL REQUESTS FOR NETWORK SERVICES USING GROUP NAME ASSOCIATION

[75] Inventors: Pi-Yu Chung, Berkeley Heights; Yennun Huang, Bridgewater; Chih-Mei Lin, Short Hills; Yi-Min Wang, Berkeley Heights, all of N.J.

[73] Assignees: AT&T Corp., New York, N.Y.; Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/818,057

[22] Filed: Mar. 14, 1997

[51] Int. Cl.[7] .................................................. G06F 13/00

[52] U.S. Cl. ..................... 709/219; 709/218; 709/227; 709/229

[58] Field of Search ................... 395/200.47, 200.48, 395/200.49, 200.57, 200.59; 709/217, 218, 219, 227, 229; 707/3, 4, 10; 345/340

[56] References Cited

U.S. PATENT DOCUMENTS

| | | | |
|---|---|---|---|
| 5,023,774 | 6/1991 | Sakai et al. | 710/29 |
| 5,621,792 | 4/1997 | Charton et al. | 380/7 |
| 5,649,103 | 7/1997 | Datta et al. | 709/203 |
| 5,680,575 | 10/1997 | Bartow et al. | 711/141 |
| 5,732,219 | 3/1998 | Blumer et al. | 709/227 |
| 5,737,592 | 4/1998 | Nguyen et al. | 707/4 |
| 5,745,900 | 4/1998 | Burrows | 707/102 |
| 5,867,495 | 2/1999 | Elliott et al. | 370/352 |
| 5,867,651 | 2/1999 | Dan et al. | 709/203 |
| 5,890,160 | 3/1999 | Hembry | 707/103 |
| 5,940,819 | 8/1999 | Beavin et al. | 707/2 |

OTHER PUBLICATIONS

"Hypertext Transfer Protocol—HTTP/1.0," Network Working Group, May 1996, <http://www.ics.uci.edu/pub/ietf/http>.

C. Yoshikawa, B. Chun, P. Eastham, A. Vahdat, T. Anderson and D. Culler, "Using Smart Clients to Build Scalable Services," Proceedings of USENIX 1997 Annual Technical Conferenece, Anaheim, California, Jan. 6–10, 1997.

T. Kwan, R. McGrath and D. Reed, NCSA's World Wide Web Server: Design and Performance, IEEE Computer, pp. 68–74, Nov. 1995.

E. Anderson, D. Patterson and E. Brewer, "The Magicrouter, an Application of Fast Packet Interposing," Symposium on Operating Systems Design and Implementation, OSDI, 1996, <http://www.cs.berkeley.edu/~eanders/magicrouter/osdi96–mr–submission.ps>.

(List continued on next page.)

Primary Examiner—Frank J. Asta
Assistant Examiner—Jason D. Cardone

[57] ABSTRACT

A registration applet embedded in a registration page of a browser program allows a user to associate a user-specified group name with a plurality of UTRLs, HTTP POST or GET requests or other network service identifiers, such that the group name designates a category of information provided by corresponding network services. An access applet embedded in an access page of the browser allows a user to select one of several previously-registered group names, and an access mode for processing responses to service requests. A processor running the access applet automatically issues parallel requests to the network services associated with a selected group name in response to entry of a command by the user. The user may select a parallel-any access mode, in which the processor displays only the first response to the parallel requests, a parallel-all mode, in which the processor directs the display of multiple responses in a user-specified display format, or a retry access mode, in which the processor reissues a network service request if a response to a previous request is not received within a predetermined time period.

35 Claims, 3 Drawing Sheets

OTHER PUBLICATIONS

Cisco Local Director, <http://www.cisco.com/warp/public/751/lodir/index.html>.

C. Weider and P. Deutsch, "A Vision of an Integrated Information Service," Network Working Group, RFC 1727, Dec. 1994.

B. Ladd, M. Capps, P. Stotts and R. Furuta, "Multi–Head Multi–Tail Mosaic: Adding Parallel Automata Semantics to the Web," Fourth International World Wide Web Conference, 1995.

C.L. Brooks, M. Mazer, S. Meeks and J. Miller, "Application–Specific Proxy Servers as HTTP Stream Transducers," Fourth International World Wide Web Conference, 1995.

C.L. Brooks, "Wide Area Information Browsing Assistance Final Technical Report," The Open Group Research Institute, Sep. 1996.

M.E. Crovella and R.L. Carter, "Dynamic Server Selection in the Internet," Proceedings of the Third IEEE Workshop on the Architecture and Implementation of High Performance Communication Subsystems (HPCS '95), Aug. 1995.

Computer ESP Search Site, <http://www.amazon.com>.

CLIENT-SIDE PARALLEL REQUESTS FOR NETWORK SERVICES USING GROUP NAME ASSOCIATION

FIELD OF THE INVENTION

The present invention relates generally to communication networks such as the Internet and more particularly to techniques for accessing information over a network using parallel client requests such that information availability and display format is enhanced.

BACKGROUND OF THE INVENTION

The World Wide Web has become a primary source of information useful in everyday life, such as news, stock quotes, weather forecasts, product prices and the like. The World Wide Web and other portions of the Internet utilize an application-level protocol, known as the Hypertext Transfer Protocol (HTTP), which is based on a client/server architecture. The HTTP protocol is described in greater detail in "Hypertext Transfer Protocol—HTTP/1.0," Network Working Group, May 1996, <http://www.ics.uci.edu/pub/ietfhttp>, which is incorporated by reference herein. Many people use bookmark features of a web browser program to store Uniform Resource Locators (URLs) which identify web sites they access frequently. However, the explosive growth in the popularity of the World Wide Web has led to increased Internet congestion and has overloaded many web servers, making it more difficult to obtain desired information within a reasonable time.

A number of techniques have been proposed to provide user-transparent fault tolerance and load balancing by using more than one server to serve the same URL. An exemplary client-side approach, referred to as Smart Client, is described in C. Yoshikawa, B. Chun, P. Eastham, A. Vahdat, T. Anderson and D. Culler, "Using Smart Clients to Build Scalable Services" Proceedings of USENIX 1997 Annual Technical Conference, Anaheim, Calif., Jan. 6–10, 1997, which is incorporated by reference herein. The Smart Client approach involves a service providing an applet running at the client site. The applet makes requests to several mirror sites to collect information about server loads and other server characteristics, and forwards each service request to an appropriate server based on that information. Fault tolerance and scalability are implemented at the client site. Other techniques include, for example, a server-side DNS approach which implements server load balancing in the domain name to Internet Protocol (IP) address translation process, as described in T. Kwan, R. McGrath and D. Reed, "NCSA's World Wide Web Server: Design and Performance, IEEE Computer, pp. 68–74, November 1995, which is incorporated by reference herein. A server-side single-address image approach known as network address translation is described in greater detail in E. Anderson, D. Patterson and E. Brewer, "The Magicrouter, an Application of Fast Packet Interposing" Symposium on Operating Systems Design and Implementation, OSDI, 1996, <http://www.cs.berkeley.edu/~eanders/magicrouter/osdi 96-mr-submission.ps>, and Cisco Local Director,<http://www.cisco.com/warp/public/751/lodir/index. html>, both of which are incorporated by reference herein.

A significant problem with the above techniques is that they are generally service-centric, that is, developed from a service provider point of view and with the interests of specific services in mind. As a result, the techniques generally do not allow users to exercise a sufficient amount of control over the manner in which the enhanced availability is provided. For example, the above techniques do not allow a user to customize an access mode to obtain information from multiple sites providing similar information but maintained by different service providers. Other techniques which attempt to alleviate this problem are described in, for example, C. Weider and P. Deutsch, "A Vision of an Integrated Information Service" Network Working Group, RFC 1727, December 1994; B. Ladd, M. Capps, P. Stotts and R. Furuta, "Multi-Head Multi-Tail Mosaic: Adding Parallel Automata Semantics to the Web" Fourth International World Wide Web Conference, 1995; C. L. Brooks, M. Mazer, S. Meeks and J. Miller, "Application-Specific Proxy Servers as HTTP Stream Transducers" Fourth International World Wide Web Conference, 1995; and C. L. Brooks, "Wide Area Information Browsing Assistance Final Technical Report" The Open Group Research Institute, September 1996, all of which are incorporated by reference herein. However, these and other similar techniques typically do not allow users to group several individual HTTP requests into a set such that the set can be conveniently accessed by a single name. Moreover, these techniques can be difficult to integrate with standard browser programs, and generally do not provide an adequate range of user-customizable display formats which can be tailored to facilitate response comparison in on-line shopping and other important applications.

It is therefore apparent that a need exists for improved techniques for accessing information over the Internet and other communication networks, without the problems associated with the above-described conventional approaches.

SUMMARY OF THE INVENTION

The present invention provides improved access to information over a communication network such as the Internet. The invention allows users to organize URLs, HTTP POST or GET requests, or other network service identifiers into groups providing similar information. The user can then invoke parallel access to a group of network services by selecting a particular group name and a desired access mode. The multiple access modes allow a user to select the type of access most appropriate for a given application, and may be combined with features such as automatic scrolling to provide a customized display format.

An exemplary applet-based embodiment of the invention may be implemented in a browser program run by a client processor. A registration applet embedded in a registration page of the browser program allows a user to associate a user-specified group name with several URLs, HTTP POST or GET requests or other network service identifiers, such that the group name designates a category of information provided by corresponding network services. For example, the user may designate group names such as "Stock Quotes" or "Weather" to specify sets of web sites providing stock quotes and weather report information, respectively. By supporting the registration of HTTP POST requests or other similarly-formatted requests, the registration applet allows the user to associate a more complete and customized identifier with each of the network services. For example, the registration applet may allow the user to specify a keyword to be associated with each of the requests, such that a display page received in response to a given request is automatically scrolled to a location which includes the keyword.

After registering one or more groups of network service identifiers, the user invokes an access applet embedded in an access page of the browser program to select a particular group name, and an access mode for processing responses to service requests. A processor running the access applet automatically issues requests to the network services associated with the selected group name in response to entry of a corresponding command by the user. In an illustrative embodiment of the invention, the user may select from one of several distinct access modes: a parallel-any access mode, in which the processor issues multiple parallel requests and displays only the first response received while aborting any remaining requests; a parallel-all access mode, in which the processor issues multiple parallel requests and displays multiple responses in a multi-portion, single-page format, a multi-page format, or any other suitable user-specified format; a same-site retry access mode, in which the processor reissues a request to a particular network service if a previous request to that service has not received a response within a predetermined time period; and a sequential retry access mode, in which the processor issues a request to a different network service in the selected group if a response is not received from a previous request within a predetermined time. A given access applet configured in accordance with the invention may provide numerous variations and combinations of these and other access modes.

The client-side high-availability web access techniques of the present invention may be used to mask access failures, to provide faster response times for network service requests, and to present multiple responses in a customized display format. These and other features and advantages of the present invention will become more apparent from the accompanying drawings and the following detailed description.

DETAILED DESCRIPTION OF THE INVENTION

The present invention will be illustrated below in conjunction with exemplary client/server connections established over the Internet using the Transmission Control Protocol/Internet Protocol (TCP/IP) standard. It should be understood, however, that the invention is not limited to use with any particular type of network or network communication protocol. The disclosed techniques are suitable for use with a wide variety of other networks and protocols. The term "web site" as used herein is intended to include sites on the World Wide Web, on other portions of the Internet, or on other types of communication networks. The term "network service" is intended to include web sites, other Internet sites and data delivery services, as well as any other data transfer mechanism accessible by a client over a network. The term "service request" refers to a communication from a client which initiates the network service. A given service request may include multiple packets or only a single packet, depending on the nature of the request. The term "parallel" in the context of requests for network services is intended to include multiple requests issued before any particular one of the requests receives a response, exceeds a retry timeout period, or is otherwise resolved. Parallel service requests in accordance with the invention may, but need not, be issued substantially simultaneously. The term "automatically" in the context of the issuance of service requests refers generally to issuance of the requests without further user action.

Figure 1:
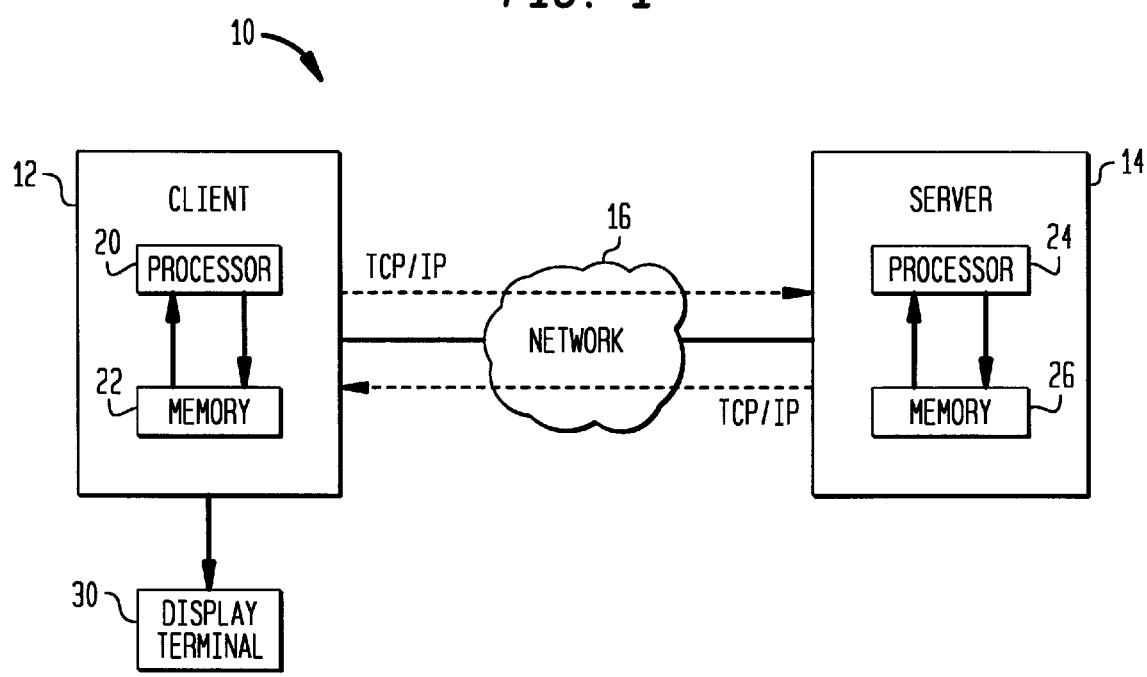
FIG. 1 is a block diagram illustrating an exemplary client-server system in which the high-availability web access techniques of the present invention may be implemented.

FIG. 1 shows a communication system 10 in which the client-side high-availability web access (HAWA) of the present invention may be implemented. The system 10 includes a client 12 which communicates with a server 14. The client 12 and server 14 are interconnected via a network 16 and communicate over a TCP/IP connection illustrated as a pair of dashed lines. The client 12 includes a processor 20 and a memory 22, while the server 14 includes a processor 24 and a memory 26. The system 10 is suitable for implementing Hypertext Transfer Protocol (HTTP)-based network services on the Internet. The client 12 generates an HTTP request for a particular service hosted by server 14, such as a request for information associated with a particular web site, and a TCP/IP connection is then established between the client 12 and server 14. The service request is generated by a web browser or other program run by processor 20 in an application layer of the client 12, and is responded to by a file transfer system or other program run by processor 24 in an application layer of the server 14. The requested network service may be designated by a uniform resource locator (URL) which includes a domain name identifying the server 14 or a corresponding server cluster hosting the service. The application-level program of the client 12 initiates the TCP/IP connection by requesting a local or remote domain name service (DNS) to map the server domain name to an IP address. The TCP and IP packet routing functions in client 12 and server 14 are provided in respective TCP and IP layers implemented by the respective processors 20, 24. The TCP and IP layers are generally associated with the transport and network layers, respectively, of the well-known Open Systems Interconnection (OSI) model. The TCP layers process TCP packets of the service request and corresponding server response. The TCP packets each include a TCP header identifying a port number of the TCP connection between the client 12 and server 14. The IP layers process IP packets formed from the TCP packets of the TCP layers. The IP packets each include an IP header identifying an IP address of the TCP/IP connection between the client 12 and server 14.

The IP address for a given network service may be determined, as noted above, by the client 12 accessing a conventional DNS. The IP layer of the client 12 uses the resulting IP address as a destination address in the IP packet headers of service request packets. The IP address together with the TCP port number provide the complete transport address for the HTTP server process. This complete address is also referred to as a TCP/IP socket. The client 12 and server 14 also include data link and physical layers for performing framing and other operations to configure request or response packets for transmission over the network 16. The server 14 responds to a given service request by supplying the requested information over the established TCP/IP connection in a number of reply packets. The TCP/IP connection is then closed, and the information in the response is displayed to the user via a display terminal 30.

The present invention provides improved access to information over the Internet or other communication network using a client-side approach. The invention makes use of the fact that for a given category of popular information, it is very likely that there are multiple web sites or other network services providing that information. The invention in a preferred embodiment permits users to organize URLs or other identifiers of network services providing similar information into a group designated by a group name. Once a group name is specified, the user need only enter the group name to access the collective information associated with the network services of the group. A program implementing the invention receives the user-selected group name, automatically issues parallel requests to multiple similar sites, and presents the user with either the first response that is received, or multiple responses arranged in a user-selected display format. The latter type of presentation recognizes that not every service unavailability can be automatically detected. For example, it is not uncommon for a web server to reply with a normal Hypertext Mark-Up Language (HTML) page containing arbitrary error messages. By presenting multiple responses to a user in a multi-portion display format, the invention allows the user to decide which response will best provide the desired information.

High-availability web access in accordance with the present invention may be implemented in a browser program running in an application layer of client 12 in FIG. 1. The client 12 may be a personal computer or other type of digital data processor associated with a given network user. An illustrative embodiment to be described in detail below utilizes access and registration applets which may be written in the Java language and embedded in the HTML code of corresponding portions, or pages, of the browser program. In order to utilize the high-availability web access features of the invention, a user at client 12 enters a registration page which contains the above-noted registration applet. This registration page is configured to allow a user to create groups of URLs or other service identifiers for categories of information, to add or delete identifiers from existing groups, and to specify retry parameters. The registration page may also support a number of other features, such as HTTP POST and GET request registration, variable substitution and automatic scrolling. Conventional browser program bookmarks, in contrast, typically allow a user to save only URLs, and are therefore unable to store an HTTP POST request or other identifier which includes significant additional message content. An exemplary HTTP POST request which includes additional message content is as follows.

```
POST http://qs.secapl.com/cgi-bin/qs HTTP/1.0
Referer: http://www.secapl.com/cgi-bin/qs
Proxy-Connection: Keep-Alive
User-Agent: Mozilla/3.0 (X11; I; IRIX 5.3 IP19)
Host: qs.secapl.com
Accept: image/gif, image/x-xbitmap, image/jpeg, image/pjpeg, */*
Content-type: application/x-www-form-urlencoded
Content-length: 13
tick = TLC + AMAT
```

The last line of the above HTTP POST request corresponds to additional message content, and in this example specifies two stock symbols, TLC and AMAT, for which a user desires price quote information. HTTP POST and GET requests are described in greater detail in the above-cited HTTP/1.0 reference.

A user can register a POST request using the registration applet contained in the registration page of the browser program. The registration applet is configured to capture an entire POST request, such as the request shown above, as part of the registered information. The variable substitution feature allows a user to change portions of a captured POST request during registration. For example, a user may want to change the last line of the exemplary POST request shown above to tick=HAWA_INPUT1 in order to invoke the registered request with arbitrary stock symbols rather than a fixed set of symbols. The automatic scrolling feature allows a user to specify a keyword for each registered request as part of the registration process. When a response to the registered request is received in the access applet, the access applet parses the response until the user-specified keyword is located, and inserts a fragment tag at that location. The access applet then appends the fragment tag to a URL sent to a browser program such that the browser program scrolls a response page retrieved from the access applet to a position designated by the fragment tag. After the user has completed the registration process and designated one or more groups of service requests, the user can proceed to an access page or portion of the browser program to invoke high-availability web access.

Figure 2:
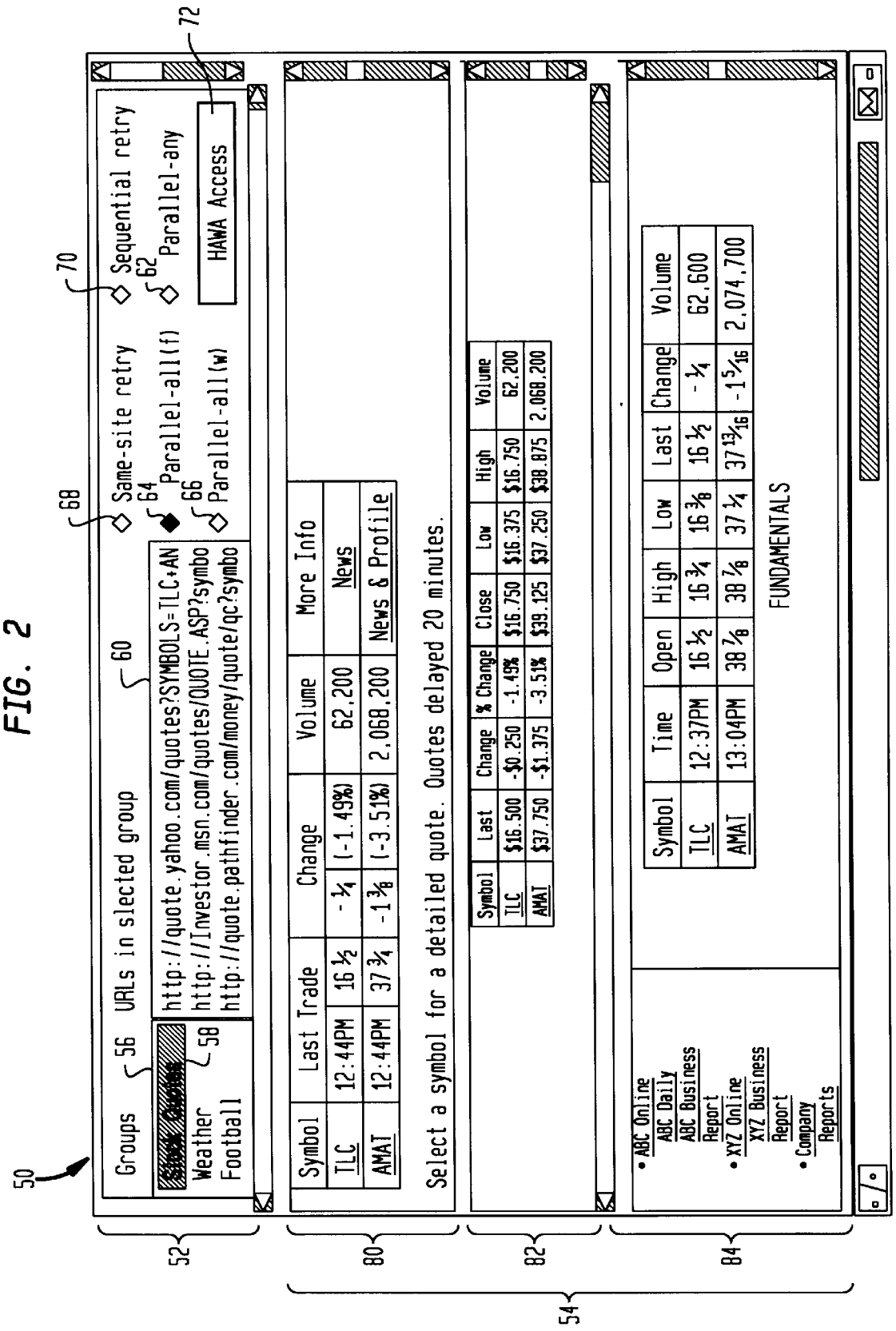
FIG. 2 shows a portion of a user terminal display generated in accordance with an exemplary client-side applet-based technique for high-availability web access in accordance with the present invention.

FIG. 2 shows a portion of an exemplary access page 50 generated at a user display terminal 30 by a browser program run by client 12 in accordance with the present invention. The exemplary access page 50 includes an access frame 52 and a data frame 54. The access frame 52 serves as an interface with the above-noted access applet, and includes a display of several group names 56 previously registered by the user. The user selects a particular one of the group names by clicking on that name in the group 56. A particular group name 58 selected by the user is then highlighted as shown, and the URLs or other network service identifiers 60 associated with the selected group name 58 are listed alongside the group names 56. In this example, the user has registered group names including "Stock Quotes" "Weather" and "Football." These group names were generated during the registration process, by the user associating a number of URLs, POST requests or other network service identifiers with each of the group names in the manner previously described. The group names therefore each refer to and identify a different source of information in the corresponding category. The user also uses access frame 52 to specify one of a number of different access modes by clicking on corresponding buttons. These access mode buttons include a parallel-any mode button 62, a parallel-all(f) mode button 64, a parallel-all(w) mode button 66, a same-site retry mode button 68, and a sequential retry mode button 70. As will be described in greater detail below, the parallel-all(f) mode displays multiple responses on a single display page, while the parallel-all(w) mode provides a different browser page or pages for each of several responses. In this example, the parallel-all(f) button 64 is highlighted, indicating that the user has selected that mode of access. The user then clicks on a "HAWA Access" button 72 in access frame 52 to enable the access applet to send out service requests in accordance with the specified access mode. The resulting responses are then displayed in a corresponding format in the data frame 54.

The various access modes supported by the exemplary access frame 52 of FIG. 2 will now be described in greater detail. The parallel-any access mode corresponding to button 62 attempts to establish TCP/IP connections for all of the service requests of a selected group. When one of the connections is established and a response is received, the remaining connection attempts are aborted, and the received response is displayed to the user. The parallel-any access mode is-therefore well-suited for use in situations in which a user needs a response as soon as possible, and in which network traffic load is not an important concern. Although the submission of multiple service requests increases processing overhead, it has been shown in M. E. Crovella and R. L. Carter, "Dynamic Server Selection in the Internet" Proceedings of the Third IEEE Workshop on the Architecture and Implementation of High Performance Communication Subsystems (HPCS '95), August 1995, which is incorporated by reference herein, that conventional dynamic server selection techniques generally outperform static selection techniques. The parallel-any access mode of the present invention is a heretofore unknown dynamic server selection technique, and therefore may be expected to outperform certain static techniques.

The parallel-all modes corresponding to buttons 64 and 66 perform parallel accesses to all network service identifiers of a selected group, and display all of the responses to the user. This addresses the fact that web sites and other network services often explicitly indicate that there is no guarantee as to the accuracy of the supplied information. The parallel-all modes provide information redundancy which allow a user to verify correctness of information supplied by a particular web site or other network service. The user receives information in the category identified by the group name from several network services, and obtains a higher confidence level in the information of a given network service by comparing it to similar information from other network services in the group. For example, a user may want to see winning lottery numbers from multiple sites before discarding his or her lottery tickets. Other types of information, such as weather forecasts, simply cannot be guaranteed to be correct. The parallel-all access modes of the present invention allow a user to make the best possible use of such information. In the case of weather forecasts, the user may utilize the parallel-all mode to obtain forecasts from several weather-related web sites, and process the information by using a majority vote or planning for the worst case scenario. As noted previously, the two exemplary parallel-all modes provide two different display options. The parallel-all(f) mode displays multiple responses in different portions of a data frame on a single page, while the parallel-all(w) mode generates a separate display page or pages for each of the responses.

The same-site retry mode corresponding to button 68 performs a periodic retry of those service identifiers for which a response is not received within a predetermined time period. When a particular service request is submitted over a TCP/IP connection to the corresponding server, it may not receive a response for any of a number of different reasons, such as network congestion, server overload, server failure and the like. Because many of these problems are transient in nature, resubmitting the same request at a different time can often bypass the problem. Even if the same problem persists, resubmitting the request can still be helpful because the resubmitted request may be routed to a different server in a server cluster supporting the corresponding network service. For example, in the server-side round-robin DNS routing technique described in T. Kwan, R. McGrath and D. Reed, "NCSA's World Wide Web Server: Design and Performance, IEEE Computer, pp. 68–74, November 1995, server load balancing is provided by translating a single host domain name to IP addresses of different servers in a round-robin fashion. In the network address translation approach utilized in the Cisco Local Director, <http://www.cisco.com/warp/public/751/lodir/index.html>, a single host IP address may be translated to an IP address of any of the servers in the server cluster. Moreover, even if a resubmitted service request is sent to the same failed server, a back-up server may have taken over the request processing tasks of the failed server since the previous request submission. The same-site retry access mode takes advantage of these factors by allowing a user to specify, during the registration process, retry parameters including a timeout period, a retry period and a maximum number of retries, for each of the network service identifiers in a given group. If the user has selected the same-site retry mode, the access applet performs the periodic retry operations using the user-specified parameters. The same-site retry mode is particularly well-suited for situations in which a user has a strong preference for a primary site in a selected group, and the unavailability of that site is likely to be transient in nature.

The sequential retry mode corresponding to button 70 tries a different network service identifier in the selected group after an access failure of another identifier. The access applet sets up a timeout period for each request of the selected group in accordance with user-specified retry parameters. As noted above, the user may specify the retry parameters as part of the registration process. The access applet then sequentially sends out the first service request in the group, waiting for a response to that request before sending the next request in the group. If the first request in the group fails to receive a response within a designated timeout period, the access applet automatically sends out the next request. This process repeats until either one of the requests receives a response or the list of requests in the group is exhausted. Since different sites are rarely down at the same time, the sequential retry access mode of the present invention can greatly improve service availability.

FIG. 2 illustrates the data frame 54 which results when a user selects the parallel-all(f) access mode with the selected group "Stock Quotes." The parallel-all(f) mode displays multiple responses in a number of different portions 80, 82 and 84 of data frame 54. Each of the portions 80, 82, 84 displays the information received in response to a particular service request directed to one of the network service identifiers 60 of the selected group 58. In this example, the identifiers 60 identify three different web sites providing stock quotes. The user has registered the above-described POST request, including the fixed set of stock symbols TLC and AMAT, when forming the selected group 58. The service requests to the stock quote web sites corresponding to identifiers 60 therefore include an indication that the user is requesting stock quotes for the stock symbols TLC and AMAT. The resulting responses are displayed in the portions 80, 82 and 84, and provide the latest information available from the three different web sites for the requested stock quotes. It can be seen from FIG. 2 that although the three sites all provide the requested stock quotes, each does not provide exactly the same information. For example, since the sites sample the stock quotes at different points in time, the user can compare the values listed in the "Volume" columns to determine which quotes are the most up-to-date. Also, each of these three exemplary sites provides different additional information, such as news links, closing prices, opening prices and so on.

The example of FIG. 2 demonstrates that the parallel-all access modes of the present invention provide at least two significant advantages over conventional web access techniques. First, since multiple similar sites often update their information at different times, the parallel-all access modes allow users to obtain the most up-to-date information. This is important for numerous information categories, including, for example, sports scores, election results and news headlines. Second, the parallel-all modes allow the users to assemble all related information into one or more display pages for ease of access, analysis and review. The parallel-all access modes provide these advantages in numerous applications other than the weather report and stock quote applications previously described. For example, the parallel-all modes are very useful in on-line shopping for products with unique item numbers or other identifiers. A user can utilize the registration page described above to register multiple web sites using a POST request including the unique identifier for a desired product, in order to receive, display and compare prices for the product. One such identifier may be an International Standard Book Number (ISBN) of a book which a user would like to purchase from one of several different on-line bookstores. The user registers the ISBN in a POST request for each of the desired web sites, and uses a parallel-all access mode with automatic scrolling to display the portion of each response showing the price in each on-line bookstore associated with the book having the designated ISBN. The user can apply the above-noted variable substitution feature to change the ISBN associated with the registered POST requests when shopping for another book. The parallel-all modes thus make it very easy for a user to obtain the best available price for a given product by comparing on-line prices from multiple web sites.

It should be noted that the parallel-any, same-site retry and sequential retry access modes may encounter problems in applications in which service unavailability is difficult to detect. For example, a stock quote server may respond to a service request with an otherwise normal HTML page containing a message indicating that the requested data could not be provided because the data source is down. Since this stock quote server is most likely not as heavily loaded as the servers of the other sites in the group, its response often comes back first, thereby defeating the purpose of the parallel-any access mode. As another example, a proxy server may send back a default page with error messages if it fails to establish a connection with a site requested by a user. In these and other situations in which service availability can be best identified by the user, the parallel-all access modes may be more likely to provide the desired information.

Figure 3:
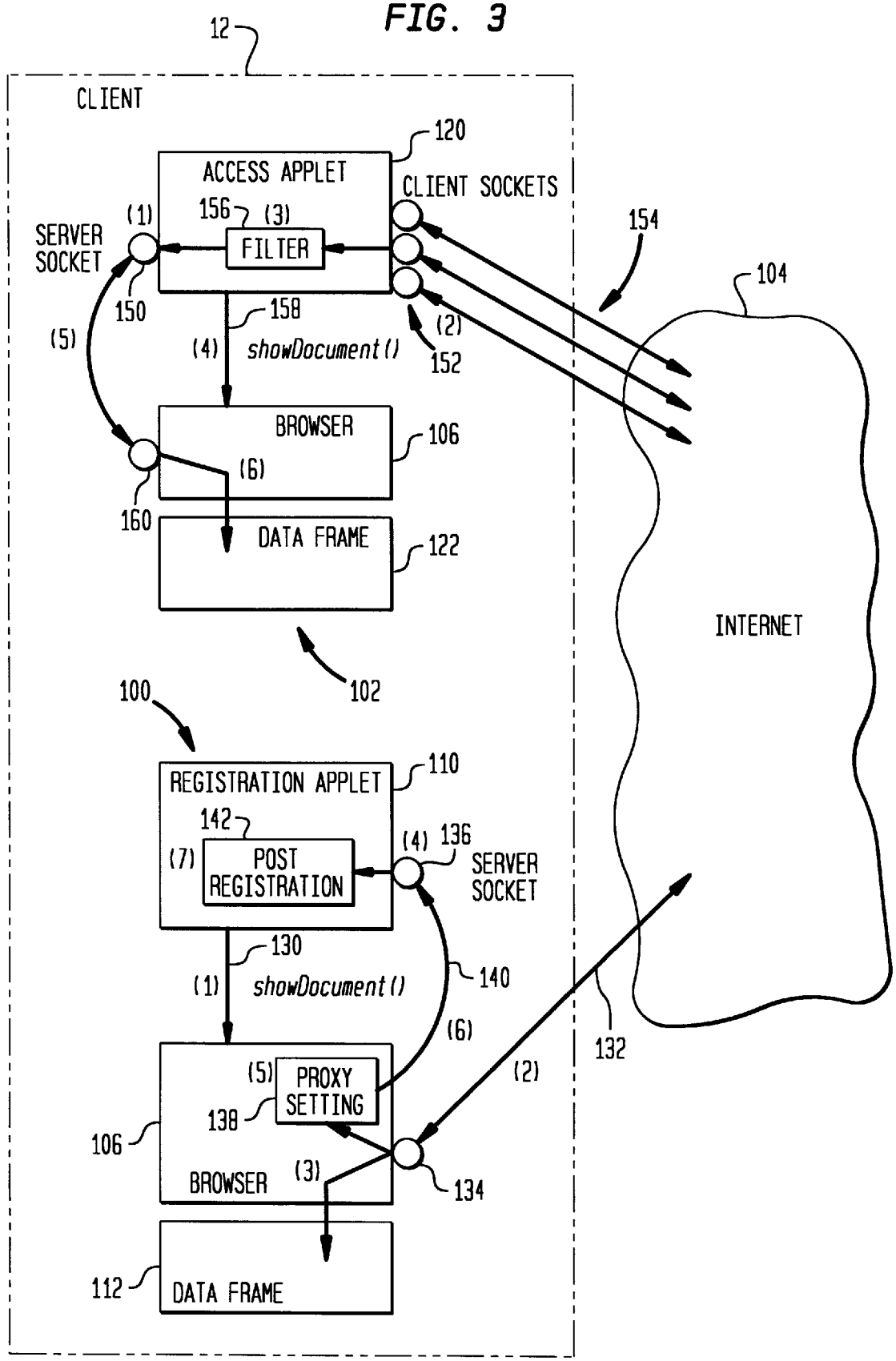
FIG. 3 illustrates the operation of an exemplary client-side applet-based technique for high-availability web access suitable for generating the user terminal display of FIG. 2.

FIG. 3 illustrates the operation of an exemplary applet-based embodiment of the present invention implemented in client 12 of FIG. 1. The operation is separated into a registration portion 100 and an access portion 102, both of which run in an application layer of the client 12. The client 12 running the registration portion I 00 and access portion 102 communicates via the Internet 104 with servers configured to support a wide variety of web sites and other network services. The registration portion 100 and access portion 102 may be configured to operate in conjunction with or as part of a browser program 106. The browser program 106 is designed to provide web access in accordance with the HTTP protocol and to display responses to service requests in HTML format. The registration portion 100 and access portion 102 include a registration applet 110 and an access applet 120, respectively. The registration and access applets 110, 120 may be Java applets embedded in the HTML code of respective registration and access pages displayed by the browser program 106. The registration and access pages also include respective data frames 112, 122.

The operation of the registration portion 100 of FIG. 3 will now be described in greater detail. The numbers in parentheses indicate the relative order of the processing steps to be described. A user at client 12 begins the registration process for a service request to be associated with a group name by typing in the corresponding URL in a designated field of the registration page. The registration applet then calls a Java function known as showDocument() as indicated at line 130. The argument of the showDocument() call generally includes a frame name and a URL. The URL entered by the user is supplied as part of the argument of the showDocument() call sent to the browser program 106. The showDocument() call on line 130 requests the browser program 106 to establish a TCP/IP connection 132 with the Internet 104 via a TCP/IP socket 134 in order to retrieve information associated with the designated URL. The TCP/IP socket includes a TCP port address concatenated with an IP address. The browser program 106 displays the retrieved information in the data frame 112 associated with the registration page.

The registration applet 110 also opens a server socket 136 using a predetermined TCP port number, such as port number 8383. The server socket 136 will act as a temporary HTTP proxy server which will intercept outgoing requests from the browser 106. After the user fills out a form in the data frame 112 of the registration page, the user manually alters a proxy setting 138 in the browser program 106 by specifying the machine name and port number for the proxy server socket 136. The user in this example designates localhost as the machine name and 8383 as the port number on localhost. This provides an indication to the browser program 106 that the proxy server is TCP port number 8383 on localhost and thus the server socket 136. The user then enters a submit command by clicking on a corresponding button of the registration page. The browser program 106 responds by sending an HTTP request to the server socket 136 as indicated by line 140. The registration applet 110 receives the HTTP request from the browser program 106 and displays it in a text field of the registration page. The user enters any retry parameters or other information to be associated with a particular request in the group in a POST registration block 142 of registration applet 110. The user saves the request message and any associated parameters in memory 22 by entering a register command corresponding to a button of the registration page. The user can utilize the above-noted variable substitution feature by editing the content of the request message before entering the register command. The registration process of FIG. 3 is repeated for other service requests of a given group, until the group includes the desired number of service requests. A similar process may be used to register other types of requests, including non-POST URLs and HTTP GET requests as defined in the above-cited HTTP/1.0 reference.

The operation of the access portion 102 of FIG. 3 will now be described in greater detail. Again, the numbers in parentheses indicate the relative order of the processing steps to be described. The user selects a group name and an access mode by clicking on the appropriate portions of access frame 52 in the manner previously described. The access applet 120 opens a number of client sockets 152 for establishing TCP/IP connections 154 with the Internet 104. Service requests and corresponding responses are communicated between access applet 120 and Internet 104 over the TCP connections 154. In general, one client socket 152 and TCP/IP connection 154 is associated with each of the service requests of a particular group selected by the user in the access frame 52. As noted above, each TCP/IP socket includes a TCP port address concatenated with an IP address. The access applet 120 sends the service requests over the corresponding connections 154 to the Internet 104, and receives responses from servers identified by the URLs in the service requests. The access applet 120 includes a filter 156 which filters the responses in accordance with the characteristics of the selected access mode. The access applet 120 also opens a server socket 150 using a predetermined TCP port number, such as port number 8282. As will be described in more detail below, the server socket 150 listens for a request from the browser program 106 for filtered responses. The access applet 120 may open the server socket 150 prior to opening client sockets 152 in accordance with the numbers in parentheses in FIG. 3. Alternatively, the access applet 120 may open the server socket 150 only after the responses are received and filtered.

When one or more responses have been filtered and are ready for display to the user, the access applet 120 issues a showDocument() call to the browser program 106 as indicated on line 158. The argument of this showDocument() call includes a URL of the form http://localhost:8282/, and therefore directs the browser program 106 to go to TCP port number 8282 of localhost to retrieve the filtered responses. The browser program 106 responds by sending a request for the filtered responses to the server socket 150. The access applet 120 then supplies the filtered responses through server socket 150 to a corresponding socket 160 of the browser program 106, such that the browser program can display the responses in data frame 122. If the selected access mode is a parallel-all(f) mode, the data frame 122 may correspond to the exemplary data frame 54 of FIG. 2. Security functions can be provided by, for example, generating a one-time password in the access applet 120, and including the password in the URL http://localhost:8282/ sent by the access applet 120 to the browser program 106 in the argument of the showDocument() call. The browser program 106 includes the one-time password in its above-noted request for the filtered responses from server socket 150. The server socket 150 of the access applet 120 checks the password and the client IP address to ensure that the request for filtered responses is from the browser program 106. The above-described access operations are generally repeated each time the user selects a group name, selects an access mode, and then clicks on the HAWA access button in access frame 52 of FIG. 2.

Operations of the access portion 102 of FIG. 3 which are specific to particular access modes will now be described. In a parallel-all(f) access mode for which automatic scrolling has been specified by the user, the access applet 120 makes a first showDocument() call, followed by a set of additional showDocument() calls, to the browser program 106. The first showDocument() call specifies a simple HTML page having a number of portions equivalent to the number of service identifiers in the selected group, with one frame tag for each of the portions. Each of the frame tags includes a frame name and a URL pointing to a file name designating an empty page. As part of the above-described filtering process carried out in filter 156, the access applet 120 parses each response to locate a user-specified keyword, and inserts a fragment tag at the corresponding point in the response. The set of additional showDocument() calls generated by the access applet 120, one for each portion of the HTML page, directs the browser program 106 to overwrite the specified frame names of the HTML page with the corresponding filtered responses retrieved from server socket 150. The access applet 120 appends the appropriate fragment tags to the URLs in the argument of the second showDocument() call, such that the browser program 106 is directed to scroll each of the retrieved filtered responses to a point designated by its fragment tag. Each response of the resulting display is thereby automatically scrolled to a location designated by the user in the above-described registration process. In an alternative embodiment of the invention in which automatic scrolling is not specified, the access applet 120 may issue a single showDocument() call specifying frame names and the corresponding actual URLs of the network services of the selected group. The browser program 106 can then retrieve the responses via a direct connection with Internet 104, rather than through connections established by the access applet 120 as in the previous embodiment. The parallel-all (w) mode may be implemented by issuing multiple showDocument() calls with undefined frame names, such that a separate browser window is created for each response.

When either the same-site retry mode or the sequential retry mode is selected, the access applet 120 opens a client socket 152 and attempts to establish a TCP/IP connection 154 with the requested site. It also starts a timer in the filter 156 based on the user-specified timeout period. If the attempted connection to the requested site results in an input/output (I/O) exception or other connection problem, or if the timer expires, another attempt is made to establish a connection. In the same-site retry mode, repeated attempts are made to connect to the requested site, until a user-specified maximum number of retries is reached. In the sequential retry mode, the access applet 120 proceeds sequentially through the list of network service identifiers in the selected group, attempting to establish a connection with the corresponding sites. When the access applet 120 successfully receives a response over an established TCP/IP connection, it performs any necessary filtering in the filter 156, and supplies the filtered response via server socket 150 in response to a request from the browser program 106. The parallel-any access mode utilizes a similar procedure except that the access applet simultaneously opens multiple client sockets 152 and attempts to establish corresponding TCP/IP connections with all of the requested sites in the selected group. When the access applet successfully receives a response over an established TCP/IP connection, all remaining connection attempts are aborted.

The above-described illustrative implementation of high-availability web access in accordance with the invention provides a number of advantages over conventional approaches. The various access modes provide substantially improved user-controlled accessibility to desired information sources in numerous applications. The parallel-all modes allow a user to design a customized display of multi-site responses which facilitates information review and analysis in a wide variety of information-retrieval applications, including stock quotations, weather reports and on-line shopping. Furthermore, the applet-based implementation allows high-availability web access to be activated only when the user accesses the registration and access pages, and therefore in a manner which will not significantly interfere with other functions of the browser program. Numerous alternative embodiments may be devised by those skilled in the art without departing from the scope of the following claims.

What is claimed is:

1. A method of providing access to network services over a communication network, the method comprising the steps of:

associating, utilizing a program running on a client machine, a group name with identifiers of the network services, wherein the program permits designation of the network service identifiers to be associated with the group name, such that the group name designates a category of information provided independently by each of the network services; and automatically issuing parallel requests to the network services in response to entry of a command by a user at the client machine.

2. The method of claim 1 wherein the identifiers include a Uniform Resource Locator (LTRL) for each of the network services.

3. The method of claim 1 wherein the network services include web sites accessible over the Internet.

4. The method of claim 1 wherein the issuing step includes issuing the parallel requests substantially simultaneously.

5. The method of claim 1 wherein said command is a selection of a representation of the group name by the user.

6. The method of claim 1 further including the step of reissuing a request to a particular network service if a response to a previous request for that service is not received within a predetermined time period.

7. The method of claim 1 further including the step of displaying only the first received response to the parallel requests.

8. The method of claim 1 further including the step of displaying multiple responses corresponding to at least a subset of the parallel requests on a single display page.

9. The method of claim 8 wherein the displaying step includes displaying in accordance with user-specified display parameters.

10. The method of claim 1 wherein the program comprises a registration program embedded in a registration page of a browser program.

11. The method of claim 10 wherein the registration program permits the user to register at least one of an HTTP POST request or an HTTP GET request.

12. The method of claim 10 wherein the registration program permits the user to specify a keyword to be associated with at least one of the responses, such that a response page of a user display is automatically scrolled to a position corresponding to the keyword.

13. The method of claim 1 wherein the issuing step includes executing an access program on a processor.

14. The method of claim 13 wherein the access program is embedded in an access page of a browser program, and permits the user to select the group name from a set of group names, and to select an access mode for processing the parallel requests.

15. An apparatus for providing access to network services over a communication network, the apparatus comprising:
program means rung on a client machine for associating a group name with identifiers of the network services, wherein the program means permits designation of the network service identifiers to be associated with the group name, such that the group name designates a category of information provided independently by each of the network services; and
means for automatically issuing parallel requests to the network services in response to entry of a command by a user at the client machine.

16. The apparatus of claim 15 wherein the identifiers include a Uniform Resource Locator (URL) for each of the network services.

17. The apparatus of claim 15 wherein the network services include web sites accessible over the Internet.

18. The apparatus of claim 15 wherein the issuing means is operative to issue the parallel requests substantially simultaneously.

19. The apparatus of claim 15 wherein said command is a selection of a representation of the group name by the user.

20. The apparatus of claim 15 wherein the issuing means is further operative to reissue a request to a particular network service if a response to a previous request for that service is not received within a predetermined time period.

21. The apparatus of claim 15 further including means for displaying only the first received response to the parallel requests.

22. The apparatus of claim 15 further including means for displaying multiple responses corresponding to at least a subset of the parallel requests on a single display page.

23. The apparatus of claim 22 wherein the displaying means configures the display page in accordance with user-specified display parameters.

24. The apparatus of claim 15 wherein the program means comprises a registration program embedded in a registration page of a browser program.

25. The apparatus of claim 24 wherein the registration program permits the user to register at least one of an HTTP POST request or an HTTP GET request.

26. The apparatus of claim 24 wherein the registration program permits the user to specify a keyword to be associated with at least one of the response, such that a response page of a user display is automatically scrolled to a position corresponding to the keyword.

27. The apparatus of claim 17 wherein the issuing means includes a processor executing an access program.

28. The apparatus of claim 27 wherein the access program is embedded in an access page of a browser program, and permits the user to select the group name from a set of group names and to select an access mode for processing the parallel requests.

29. An apparatus for providing access to network services over a communication network, the apparatus comprising:
a client machine including a memory for storing a group name associated with identifiers of the network services, wherein the association is created using a program which runs on the client machine and permits designation of the network service identifiers to be associated with the group name, such that the group name designates a category of information provided independently by each of the network services, and a processor coupled to the memory and operative to issue automatically parallel requests to the network services in response to entry of a command by a user at the client machine.

30. The apparatus of claim 29 wherein the processor is further operative to display only the first received response to the parallel requests.

31. The apparatus of claim 29 wherein the processor is farther operative to simultaneously display multiple responses corresponding to at least a subset of the parallel requests on a single display page.

32. The apparatus of claim 29 wherein the program comprises a registration program embedded in a registration page of a browser program, executed by the processor.

33. The apparatus of claim 32 wherein the registration program permits the user to register at least one of an HTTP POST request or an HTTP GET request.

34. The apparatus of claim 32 wherein the registration program permits the user to specify a keyword to be associated with at least one of the responses, such that a response page of a user display is automatically scrolled to a position corresponding to the keyword.

35. The apparatus of claim 29 wherein the processor is farther operative to execute an access program embedded in an access page of a browser program, wherein the access program permits the user to select the group name from a set of group names and to select an access mode for processing the parallel requests.

* * * * *